US012333991B2

(12) United States Patent
Okamoto et al.

(10) Patent No.: US 12,333,991 B2
(45) Date of Patent: Jun. 17, 2025

(54) DISPLAY DEVICE

(71) Applicant: SHARP KABUSHIKI KAISHA, Sakai (JP)

(72) Inventors: Kenshirou Okamoto, Sakai (JP); Shinsuke Morimoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 181 days.

(21) Appl. No.: 18/125,664

(22) Filed: Mar. 23, 2023

(65) Prior Publication Data

US 2023/0316986 A1 Oct. 5, 2023

(30) Foreign Application Priority Data

Mar. 30, 2022 (JP) ................. 2022-056569

(51) Int. Cl.
*G09G 3/34* (2006.01)
*G09G 3/20* (2006.01)

(52) U.S. Cl.
CPC .......... *G09G 3/2096* (2013.01); *G09G 3/344* (2013.01); *G09G 2310/04* (2013.01); *G09G 2320/103* (2013.01); *G09G 2330/023* (2013.01); *G09G 2370/16* (2013.01); *G09G 2380/06* (2013.01)

(58) Field of Classification Search
CPC ........ G06F 3/14; G09G 3/344; G09G 3/2096; G09G 2310/04; G09G 2370/16; G09G 2330/023; G09G 2320/103; G09G 2350/00; G09G 2380/06
USPC ......................................... 345/418
See application file for complete search history.

(56) References Cited

U.S. PATENT DOCUMENTS

| 2012/0079142 | A1* | 3/2012 | Fleegal | H04N 21/4122 710/30 |
| 2015/0356184 | A1* | 12/2015 | Solomakha | G06Q 30/0242 707/734 |
| 2016/0260233 | A1* | 9/2016 | Jugel | G06T 15/405 |
| 2019/0146742 | A1* | 5/2019 | Li | G06F 3/165 345/11 |
| 2022/0398612 | A1* | 12/2022 | Murakami | G06Q 30/0204 |

(Continued)

FOREIGN PATENT DOCUMENTS

JP 2013047759 A 3/2013

OTHER PUBLICATIONS

Henzen A, van de Kamer J. The present and future of electronic paper. Journal of the Society for Information Display. May 2006; 14(5):437-42.*

*Primary Examiner* — Phu K Nguyen
(74) *Attorney, Agent, or Firm* — ScienBiziP, P.C.

(57) ABSTRACT

A display device includes a display order determiner, a display, and an image rewriter. The display order determiner determines a display order of a plurality of images. The display sequentially changes and displays the plurality of images according to the display order determined by the display order determiner. The image rewriter rewrites at least part of the image displayed on the display to change the image displayed on the display to the image in the next display order. Thus, the image displayed on the display is changed to the image in the next display order. The display order determiner determines the display order based on a rewriting cost required by the image rewriter when changing the plurality of images.

5 Claims, 9 Drawing Sheets

(56) References Cited

U.S. PATENT DOCUMENTS

| | | | |
|---|---|---|---|
| 2023/0186411 A1* | 6/2023 | Coulthurst | G06Q 50/12 705/7.35 |
| 2023/0376861 A1* | 11/2023 | Vakhutinsky | G06Q 50/12 |
| 2024/0161149 A1* | 5/2024 | Schulze | G06F 16/94 |

* cited by examiner

DISPLAY DEVICE

INCORPORATION BY REFERENCE

This application claims the priority based on Japanese Patent Application No. 2022-056569 filed on Mar. 30, 2022 under 35 U.S.C. 119. The contents of this application are incorporated herein by reference in their entirety.

BACKGROUND

The present disclosure relates to a display device.

A display device for displaying images is disclosed. Some display devices rewrite at least part of a screen displaying the image to change the displayed image to another image. Such display devices reduce the time required to change the display by, for example, rewriting only the portions of the image which are different before and after the change of the display.

SUMMARY

According to an aspect of the present disclosure, a display device includes a display order determiner, a display, and an image rewriter. The display order determiner determines a display order of a plurality of images. The display sequentially changes and displays the plurality of images according to the display order determined by the display order determiner. The image rewriter rewrites at least part of the image displayed on the display to the image in the next display order. Thus, the image displayed on the display is changed to the image in the next display order. The display order determiner determines the display order based on the rewriting cost required by the image rewriter when changing the plurality of images.

DETAILED DESCRIPTION

Figure 1:
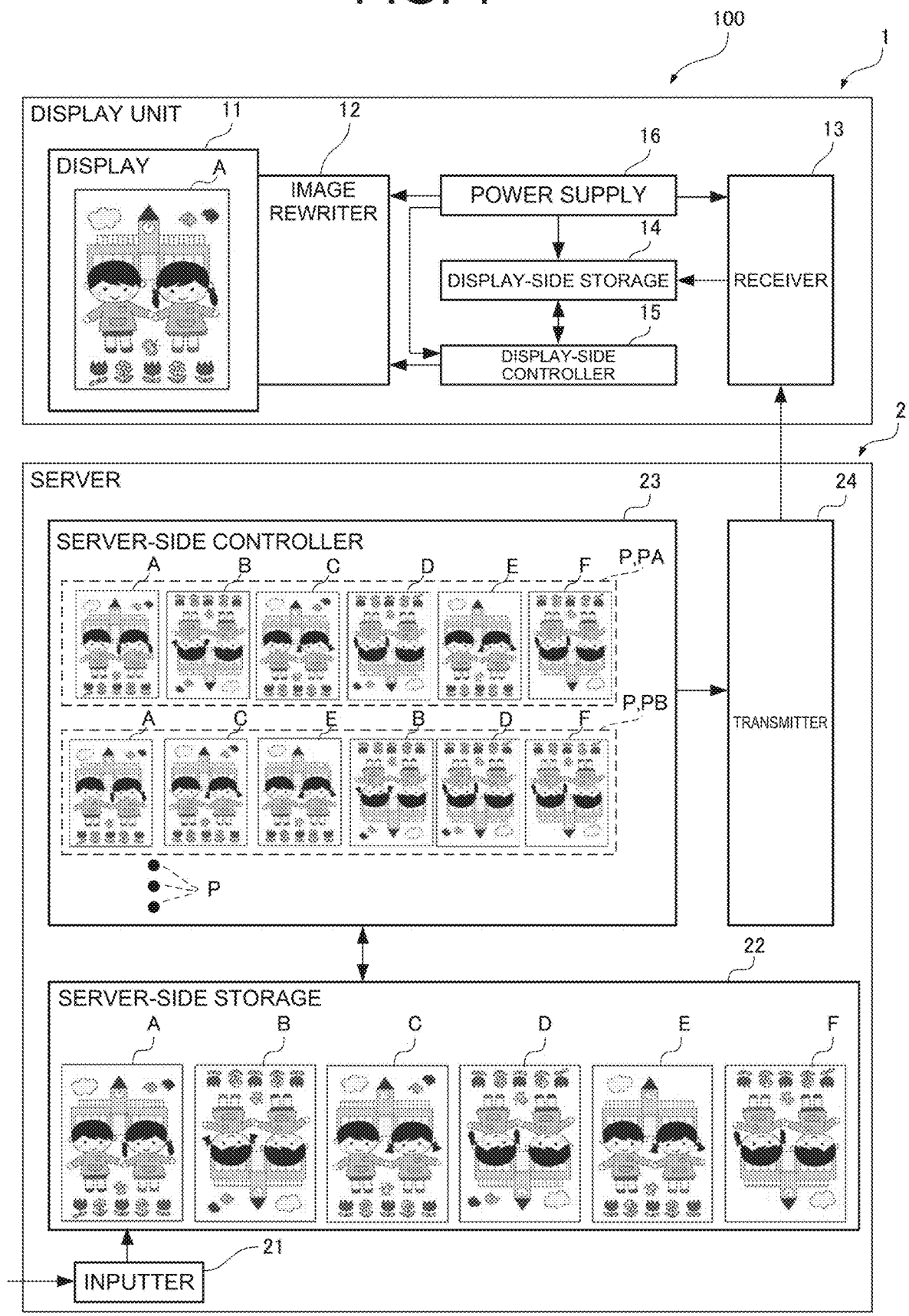
FIG. 1 illustrates a schematic diagram of a display device according to a first embodiment.

Embodiments will be described below with reference to the attached drawings. In the drawings, the same or corresponding parts are denoted with the same reference signs, and the description thereof is not repeated.

First Embodiment

Figure 2:
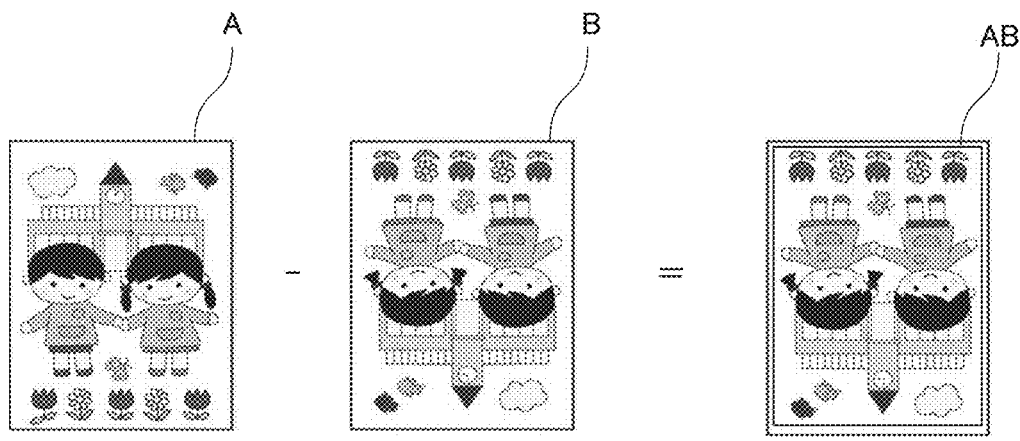
FIG. 2 illustrates an example in which images are not similar before and after the change.
Figure 3:
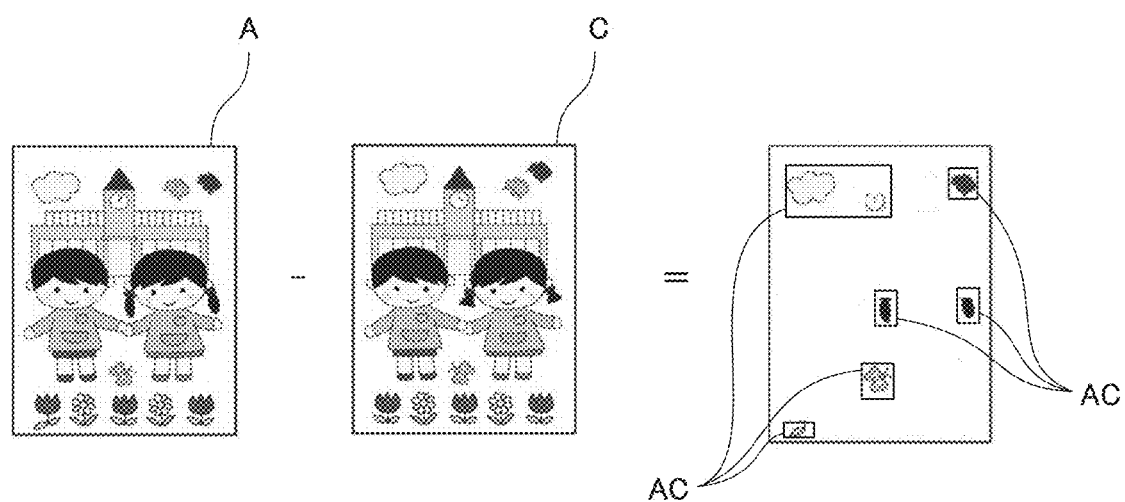
FIG. 3 illustrates an example in which images are similar before and after the change.

Referring to FIGS. 1 to 3, a display device 100 according to a first embodiment is described. FIG. 1 illustrates a schematic diagram of the display device 100 according to the first embodiment. FIG. 2 illustrates an example in which images are not similar before and after the change. FIG. 3 illustrates an example in which images are similar before and after the change.

As illustrated in FIG. 1, the display device 100 includes a display unit 1 and a server 2. The display unit 1 displays images based on image data and other data. The server 2 wirelessly transmits image data and other data to the display unit 1.

The display unit 1 is installed, for example, in town with pedestrian traffic, and is used to display images such as advertisement images in sizes ranging from about 10 to 30 inches. Such a display unit 1 often displays a plurality of images. The display unit 1 displays the plurality of images according to a predetermined display order. The display unit 1 requires electric power to change the currently displayed image to another image. On the other hand, in the town with pedestrian traffic, it is often difficult to secure a power source to supply power to the display unit 1. With the amount of power consumed by the display unit 1 kept low, the display unit 1 can continue to display the plurality of images over a longer period of time.

The display unit 1 includes a display 11, an image rewriter 12, a receiver 13, a display-side storage 14, a display-side controller 15, and a power supply 16. The display 11 displays images. The image rewriter 12 rewrites at least part of the image displayed on the display 11. The receiver 13 receives image data and other information from the server 2. The display-side storage 14 stores the image data and other information received from the server 2. The display-side controller 15 refers to the image data stored in the display-side storage 14. The display-side controller 15 controls the image rewriter 12 so that the display 11 displays the image corresponding to the image data stored in the display-side storage 14. The power supply 16 supplies power to the image rewriter 12, the receiver 13, the display-side storage 14, and the display-side controller 15.

The power supply 16 is, for example, a battery, a solar panel, or the like. The display device 100 with such a power supply 16 is advantageous in that the display device 100 can be used for a certain period of time even in locations where no power supply or other source capable of continuously supplying power can be secured.

The display 11 sequentially changes and displays the plurality of images. FIG. 1 illustrates an image A as an example of the image displayed on the display 11. The display 11 keeps the display state of the image for a certain period of time without consuming power.

The image rewriter 12 consumes power to rewrite at least part of the image displayed on the display 11. Accordingly, the image displayed on the display 11 is changed to another image. An area of the display 11 that can be rewritten by the image rewriter 12 is positively correlated with the amount of power consumed by the image rewriter 12. In other words, the larger the area that needs to be rewritten when changing the image displayed on the display 11 to another image, the greater the amount of power consumed by the image rewriter 12. Therefore, when the images are similar before and after the change, the image area or the number of pixels at the time of rewriting the image on the display 11 is smaller compared to a case in which the images are not similar before and after the change, thus consuming less power in the image rewriter 12.

The difference between examples in which the images are similar and the images are not similar before and after the change is described by specifically referring to FIGS. 2 and 3. First, FIG. 2 illustrates the example in which the images are not similar before and after the change.

In FIG. 2, the image before the change is referred to as image A, and the image after the change is referred to as image B. The images A and B are not similar. In FIG. 2, the different parts of the images A and B are enclosed in a single rectangular box and indicated as difference AB.

On the other hand, FIG. 3 illustrates the example in which the images are similar before and after the change. In FIG. 3, the image before the change is indicated as image A, and the image after the change is indicated as image C. The images A and C are similar. In FIG. 3, the different portions between the images A and C are enclosed in rectangular boxes, and each box is indicated as difference AC. Since the images A and C are similar, the difference AC is represented by areas enclosed in a plurality of rectangular boxes, and the area of the rectangular boxes of the difference AC is smaller than the area of the rectangular box of the difference AB.

When comparing the difference AB and the difference AC, the area of the rectangular box of the difference AB is larger than the total area of all rectangular boxes of the difference AC. This means that displaying the image C after the image A requires a smaller area to rewrite the image than displaying the image B after the image A, and the image rewriter 12 consumes less power.

In the display 11 illustrated in FIG. 1, the number of pixels of the part to be rewritten by the image rewriter 12 is also positively correlated with the amount of power consumed by the image rewriter 12. As used herein, a pixel means the smallest unit that constitutes an image. The greater the number of pixels that the image rewriter 12 rewrites, the greater the amount of power consumed by the image rewriter 12.

In many cases, the display 11 and the image rewriter 12 are in one-piece structure because the image rewriter 12 changes display of the display 11. An example of the one-piece structure of the display 11 and image rewriter 12 is electrophoretic electronic paper. Hereinafter, the electrophoretic electronic paper is simply be referred to as "e-paper".

The e-paper has a screen that displays images and electrodes provided along the screen. The screen and the electrodes of the e-paper correspond to the display 11 and image rewriter 12, respectively. When the electrodes form an electric field on the screen, the part of the image displayed on the screen where the field is formed is rewritten and the screen display is changed. Even after the electrodes no longer form an electric field, the screen keeps displaying the changed image for a certain period of time without consuming any power.

Unlike a liquid crystal panel or the like, the e-paper that displays images as described above can display the plurality of images with only a small amount of power. Therefore, the e-paper has the advantage that it can be used even in the town where no power source is available. Although the mainstream type of the e-paper displays in black and white using an RGB color film, colors other than black and white can also be expressed including colorful advertisements that leave a lasting impression on the viewers.

The receiver 13 receives image data and other information from the server 2, as described above. The information received by the receiver 13 includes image data as well as information on the order in which the images are displayed. The receiver 13 is a wireless communicator and includes, for example, a network interface controller (NIC) that communicates according to a predetermined communication protocol. Examples of the predetermined communication protocol include the Transmission Control Protocol/Internet Protocol (TCP/IP) protocol suite (that is, the Internet protocol suite).

The display-side storage 14 includes a storage and stores information such as image data received by the receiver 13 and computer programs. Specifically, the display-side storage 14 includes a main storage such as a semiconductor memory, a semiconductor memory, a solid state drive, and an auxiliary storage such as a hard disk drive. The display-side storage 14 may include removable media.

The display-side controller 15 includes a processor such as a central processing unit (CPU). The processor of the display-side controller 15 controls the image rewriter 12 and the display-side storage 14 by executing a computer program stored in the storage device of the display-side storage 14.

The display-side controller 15 controls the image rewriter 12 such that the image displayed on the display 11 after the receiver 13 receives the image data is the image corresponding to the image data received by the receiver 13. As mentioned above, the image rewriter 12 can change the display of the display 11 by rewriting at least part of the display of the display 11. Thus, the image rewriter 12 does not need the whole image data of the image after change to change the display of the display 11, but can change the display of the display 11 to a desired image when part of data that are different before and after the change is available. The display-side controller 15 controls the image rewriter 12 based on the part of the image data in the changed image data that differ from the image data before the change.

Specifically, when the image A is displayed on the display 11 as illustrated in FIG. 1, the image rewriter 12 only needs to rewrite portions of the display 11 corresponding to the different portions AC (see FIG. 3) to display the image C on the display 11. The display-side controller 15 controls the image rewriter 12 to rewrite only the portions of the display on the display 11 that differ before and after the change. As a result, the amount of power consumed by the image rewriter 12 can be kept low compared to rewriting the entire display 11. Once the image is changed, the display on the display 11 is sequentially changed each time the receiver 13 receives new image data.

In the above description, when the storage capacity of the display-side storage 14 is sufficiently large, the display unit 1 can receive all image display data including all image data to be displayed on the display 11, the display period of respective images corresponding to the image data, and the display order of the images corresponding to the image data. In that case, the receiver 13 receives, for example, all the image display data. The display-side storage 14 stores all the image display data received by the receiver 13. The display-side controller 15 refers to all the image data stored in the display-side storage 14 and controls the image rewriter 12 so that the display 11 displays the image corresponding to the image data in the first position in the display order. When the display period set for the image data in the first display order has elapsed, the display-side controller 15 controls the image rewriter 12 so that the display 11 displays the image corresponding to the image data in the second display order. Similarly, for the images in the second and lower display order, the display-side controller 15 also controls the image rewriter 12 to display the image in the one lower display order than the display order of the image currently displayed on the display 11 once the display period thereof has elapsed.

The server 2 is a computer installed in a location remote from the display unit 1, for example, in an indoor room, and wirelessly transmits the image data and other information to the display unit 1. Thus, the user has the advantage of being able to select images to be displayed on the display unit 1 from a place away from the display unit 1. In the indoor room or the like where the power source can be secured easily unlike in the town, the server 2 can execute arithmetic operations that consume large amounts of power. The arithmetic operations are calculations typically performed by computers, including generation of the display order of the images, calculation and temporary storage of the rewriting costs, and comparison of the rewriting costs.

The server 2 includes an inputter 21, a server-side storage 22, a transmitter 24, and a server-side controller 23. The inputter 21 is used by the user of the display device 100 to input data such as images to be displayed on the display 11 of the display unit 1. The server-side controller 23 controls the server-side storage 22 and the transmitter 24 to transmit the image data entered in the inputter 21 to the display unit 1.

The inputter 21 is an input device such as a mouse or keyboard attached to the information communication terminal.

The server-side storage 22 includes a storage device and stores information such as image data and computer programs that are entered into the inputter 21. The server-side storage 22 illustrated in FIG. 1 stores image data of the images A, B, C, D, E, and F. The server-side storage 22 includes, for example, a main storage such as a semiconductor memory, and an auxiliary storage device such as a semiconductor memory, a solid state drive, and a hard disk drive. The server-side storage 22 may include removable media.

The server-side controller 23 includes a processor such as a central processing unit (CPU). The processor of the server-side controller 23 executes the computer program stored in the storage device of the server-side storage 22 to determine the display order of the plurality of images stored in the server-side storage 22. The server-side controller 23 controls the server-side storage 22 and the transmitter 24. The server-side controller 23 is an example of a "display order determiner" in the present disclosure.

The server-side controller 23 generates the display order of the images to be displayed on the display 11 in order to determine the display order of a plurality of images. The server-side controller 23 calculates the rewriting cost of the generated images in the display order. The rewriting cost is an index that has a positive correlation with the amount of power required to rewrite the images displayed on the display 11, and is calculated from two image data in consecutive display order.

The server-side controller 23 determines the display order of the plurality of images based on the rewriting cost required by the image rewriter 12 when changing the plurality of images. Thus, the server-side controller 23 can determine the display order of the images on the display 11 to suppress the amount of power consumed by image rewriter 12 to display all the images.

In an example, the rewriting cost is the image area or the number of pixels to be rewritten by the image rewriter 12. In other words, the rewriting cost is the area or the number of pixels of different portions of two images in the consecutive display order. The smaller the rewriting cost, the smaller the area or the number of pixels of the different portions of the two images in the consecutive display order. As a result, the server-side controller 23 can suppress the amount of power consumed by the image rewriter 12 by determining the display order of the images to suppress the rewiring cost.

Another example of the rewriting cost is the amount of power consumed by the image rewriter 12. With such a rewriting cost, the server-side controller 23 can determine the display order of the images to suppress the amount of power consumed by the image rewriter 12.

The server-side controller 23 determines the display order of images by generating a plurality of display order patterns P and selecting as the display order a specific display order pattern P with the smallest total rewriting cost among the plurality of display order patterns P. Specifically, the server-side controller 23 calculates the rewriting cost of all images in the consecutive display order for each display order pattern P generated, and calculates the total rewriting cost. The server-side controller 23 selects the display order pattern P having the smallest total rewriting cost among the generated display order patterns P and determines the selected display order pattern P as the display order of the images. As a result, the image rewriter 12 that rewrites the display of the display 11 according to the display order of images determined by the server-side controller 23 consumes the smallest amount of power among all the display order patterns P generated by the server-side controller 23.

The server-side controller 23 generates all display order patterns P that are assumed to be the display orders of displaying the plurality of images on the display 11. Therefore, the server-side controller 23 can select the display order with the smallest rewriting cost from all the display order patterns P that are assumed to be the display order of the plurality of images.

Specifically, in FIG. 1, the server-side storage 22 stores six image data of the images A to F. There are a total of 720 possible display order patterns P that can be assumed when the six images from the image A to the image F are arranged randomly. The server-side controller 23 generates all of 720 display order patterns P.

The display order patterns P generated by the server-side controller 23 include, for example, a display order pattern PA and a display order pattern PB. Comparing the display order pattern PA and the display order pattern PB, the display order pattern PB includes a smaller difference between two consecutive images of all image data included therein than the display order pattern PA. This means that the total rewriting cost of the display order pattern PB is smaller than the total rewriting cost of the display order pattern PA.

The server-side controller 23 also compares the total rewriting cost of the display order pattern PB with the total rewriting cost of each of the 718 display order patterns P other than the display order patterns PA and PB. Once it is determined that the rewriting cost of the display order pattern PB is the smallest among all of the 720 display order patterns P, the server-side controller 23 selects the display order pattern PB and determines it as the display order of images to be displayed on the display 11. As a result, the image rewriter 12 that rewrites the display of the display 11 according to the image display order determined by the server-side controller 23 consumes the smallest amount of power among all possible display order patterns P.

The server-side controller 23 can also generate only some of the display order patterns P out of all the display order patterns P that are assumed to be the display orders of the plurality of images on the display 11. Specifically, 720 display order patterns P are available when six images are displayed. The server-side controller 23 generates, for example, up to 10 display order patterns P out of 720 display order patterns P. As a result, the server-side controller 23 requires less computation, and the time required for the server-side controller 23 to determine the display order can be shortened.

As described above, the server-side controller 23 selects all or some of the assumed display order patterns P, and which one is selected is determined based on, for example, the number of images to be displayed on the display 11. Specifically, when the number of images to be displayed on the display 11 exceeds a threshold, some of the display order patterns P are generated. On the other hand, when the number of images to be displayed on the display 11 is less than the threshold, all display order patterns P are generated. The threshold for the number of images to be displayed on the display 11 is determined based on the processing capabilities such as processing speed of the server-side controller 23.

The server-side controller 23 controls the transmitter 24 to transmit the respective images to the receiver 13 of the display unit 1 at the timing of displaying the images on the display 11 of the display unit 1 according to the determined display order. Here, as mentioned above, the image data of different portions of the image before and after the change is enough to change the display of the display 11. Therefore, the server-side controller 23 controls the transmitter 24 to send only the image data of different portions before and after the change in the changed image data. Furthermore, the display order in which images are displayed is determined based on the rewriting cost. When the rewriting cost of the display order is small, the areas of the different portions before and after the change of the image can be smaller. As a result, the volume of image data transmitted by the transmitter 24 can be suppressed.

The transmitter 24 transmits the image data of the different portions before and after the change in the modified image data to the display unit 1. The display unit 1 displays the changed image at the timing when it receives the image data from the transmitter 24. The transmitter 24 is a communicating device similar to the receiver 13, and specific description thereof is omitted.

It has been described that the server 2 transmits the image data corresponding to the image to be displayed on the display unit 1 to the display unit 1 at the timing when the image is to be displayed on the display unit 1. Alternatively, the server-side controller 23 can differently control the transmitter 24 when the storage capacity of the display-side storage 14 of the display unit 1 is large enough to store all the image display data.

In an example of the display-side storage 14 having a sufficient storage capacity, the server-side controller 23 may control the transmitter 24 to transmit the all image display data mentioned above. As a result, the display unit 1 that has received the all image display data stores the all image display data in the display-side storage 14. The all image display data includes information on the image data, the display period of the image data, and the display order of the image data. Therefore, the display-side controller 15 can control the image rewriter 12 to display on the display 11 all images to be displayed on the display 11 based on the all image display data stored in the display-side storage 14. Under the control of the server-side controller 23, the image rewriter 12 sequentially rewrites the display of the display 11 to sequentially change the display of the display 11. This eliminates the need for the server 2 to transmit the information such as the image data to the display unit 1 each time the display is changed on the display 11, thus reducing the number of times the server 2 transmits information to the display unit 1. Accordingly, the display device 100 can be used without hindrance even in locations where communication between the server 2 and the display unit 1 is intermittently disconnected.

In another example of the display-side storage 14 having a sufficient storage capacity, the display-side storage 14 may store in advance all the image data corresponding to the images to be displayed on the display 11, except for the information on the display order of those image data. In that example, the server-side controller 23 controls the transmitter 24 to transmit only the information on the display order of images. The display-side controller 15 controls the image rewriter 12 to display images corresponding to the image data stored in the display-side storage 14 according to the information on the display order of images received by the receiver 13. The image rewriter 12 sequentially rewrites the display on the display 11 according to the received display order. Thus, the display on the display 11 is changed sequentially. As a result, the server 2 needs to transmit to the display unit 1 only the information of the display order of the images, thus reducing the amount of information to be transmitted when compared to transmitting the image data. As a result, the display device 100 can be used without hindrance even in locations with communication environments that do not allow the transmission of large amounts of information.

Figure 4:
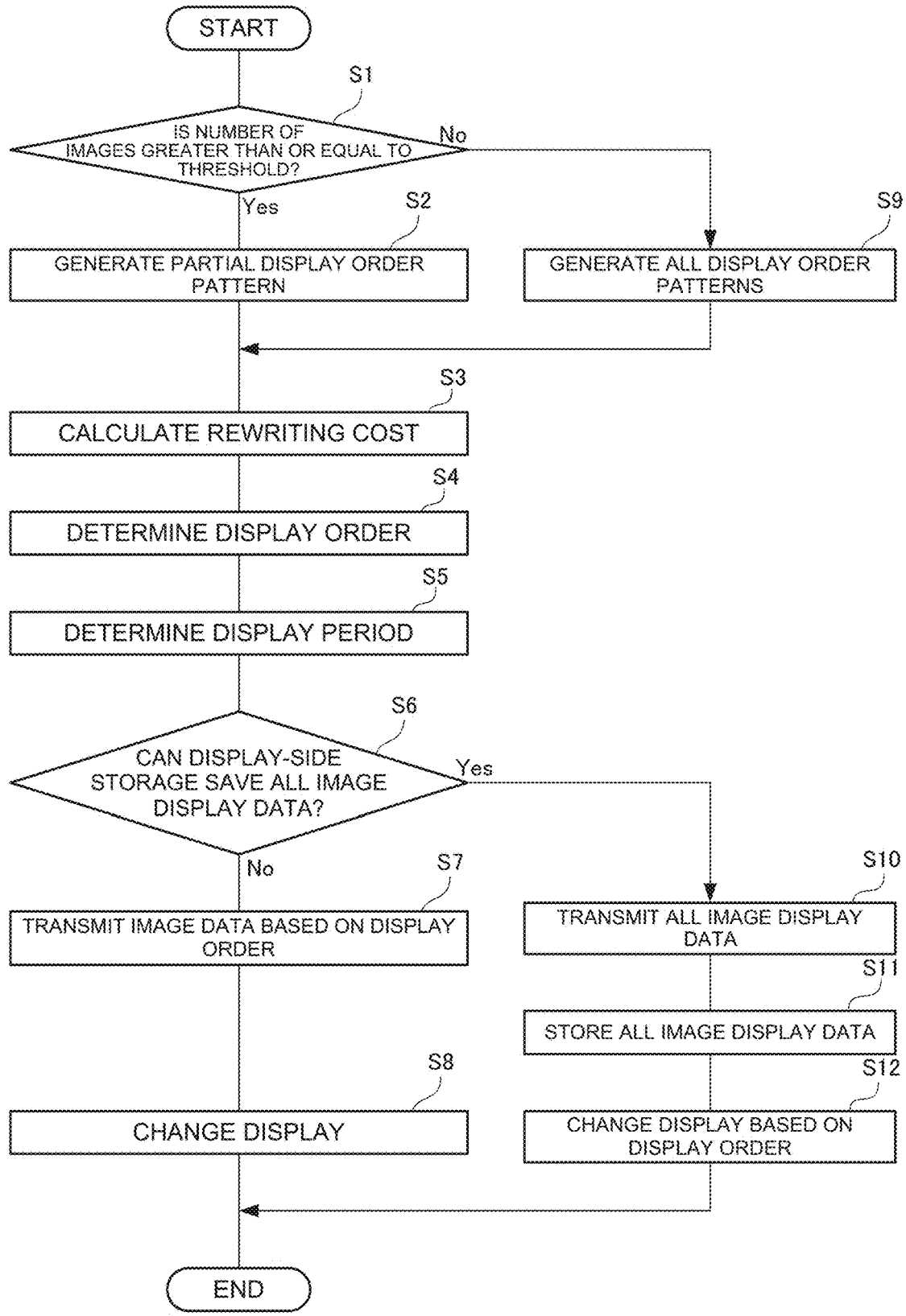
FIG. 4 is a flowchart illustrating the processing of the display device according to the first embodiment.

By referring to FIGS. 1 and 4, the processing of the display device 100 according to the first embodiment is described. FIG. 4 is a flowchart illustrating the processing of the display device 100 according to the first embodiment. The processing of the display device 100 includes steps S1 to S12.

In step S1, the server-side controller 23 determines whether the number of images stored in the server-side storage 22 is greater than or equal to a threshold.

If a positive determination (Yes) is made in step S1, the process proceeds to step S2.

In step S2, the server-side controller 23 generates some display order patterns P out of all display order patterns P of the plurality of images stored in the server-side storage 22. The process then proceeds to step S3.

On the other hand, if a negative determination (No) is made in step S1, the process proceeds to step S9. In step S9, the server-side controller 23 generates all display order patterns P of the plurality of images stored in the server-side storage 22. The process then proceeds to step S3.

In step S3, the server-side controller 23 calculates the total rewriting cost for each of the generated display order patterns P.

In step S4, the server-side controller 23 selects the display order pattern P having the smallest total rewriting cost among the generated display order patterns P, and determines the selected display order pattern P as the display order of the images. The server-side controller 23 does not necessarily select the display order pattern P having the smallest rewriting cost, but may refer to various conditions and select a display order pattern P having the rewriting cost that is compatible with such conditions. In this way, the server-side controller 23 can flexibly select the display order pattern P according to the conditions to be referenced. For example, the user can enter the various conditions in advance to the inputter 21 to store them in the server-side storage 22, so that the server-side controller 23 can refer them from the server-side storage 22.

In step S5, the server-side controller 23 determines the display period of each image of the plurality of images. The display period of each image is determined by, for example, the server-side controller 23 in accordance with the computer program executed by the server-side controller 23.

In step S6, the server-side controller 23 determines whether the display-side storage 14 can store the all image display data. The determination of whether the display-side storage 14 can store the image data may be made in any way. For example, such determination can be made by previously storing the information that the display-side storage 14 can store the all image display data, and referring the information by the server-side controller 23. If the negative determination (No) is made in step S6, or the server-side controller 23 determines that the display-side storage 14 cannot store the all image display data, the process proceeds to step S7.

In step S7, the server-side controller 23 sequentially transmits the image data according to the determined display order. Here, the server-side controller 23 transmits the image data in the one lower display order at the timing when the display period specified in the transmitted image data elapses.

In step S8, the display-side controller 15 controls the image rewriter 12 to display the image corresponding to the received image data at the timing when the receiver 13 receives the image data sequentially transmitted from the transmitter 24 of the server 2. The image rewriter 12 rewrites at least part of the display 11 to change the image displayed on the display 11 to the image corresponding to the image data received by the receiver 13. The process ends when all images to be displayed on the display 11 are displayed.

If the positive determination (Yes) is made in step S6 above or the server-side controller 23 determines that the display-side storage 14 can store the entire all image data, the process proceeds to step S10.

In step S10, the server-side controller 23 controls the transmitter 24 to transmit the all image display data to the display unit 1.

In step S11, the display-side controller 15 controls the display-side storage 14 to store the all image display data received by the receiver 13. The display-side storage 14 stores all the image display data received by the receiver 13.

In step S12, the display-side controller 15 controls the image rewriter 12 to change the display of the display 11 according to the display order of the images and the display period of each image. Thus, the display on the display 11 is changed according to the display order of the respective images and the display period. After that, the process ends.

Second Embodiment

Figure 5:
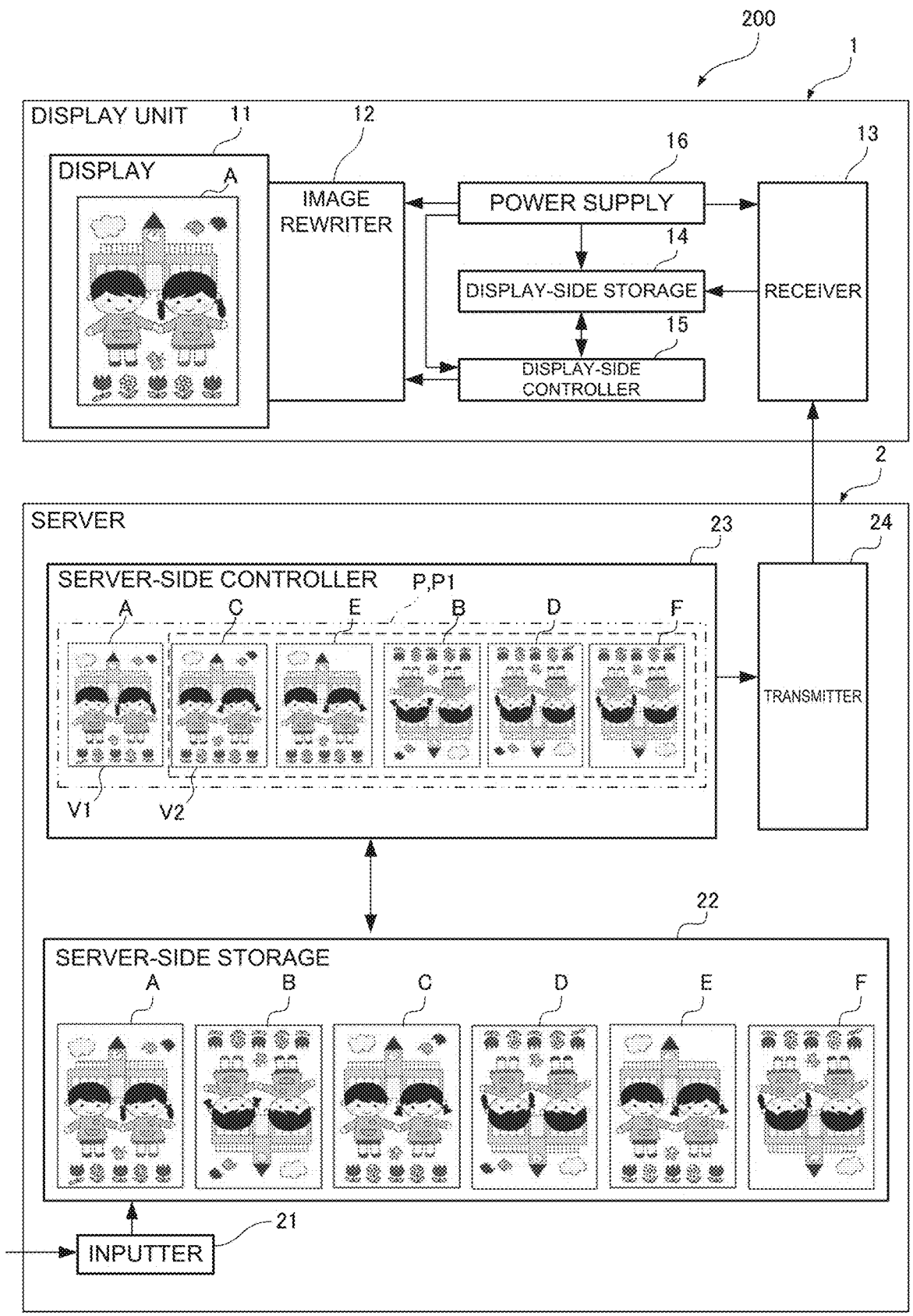
FIG. 5 illustrates a schematic diagram of the display device according to a second embodiment.

A display device 200 according to a second embodiment is described by referring to FIG. 5. FIG. 5 illustrates a schematic diagram of the display device 200 according to the second embodiment. The display device 200 according to the second embodiment differs from the first embodiment mainly in generation of the display order pattern P in the server-side controller 23. In the following, the difference between the first and second embodiments is mainly described.

The server-side controller 23 illustrated in FIG. 5 selects an initial image V1 to be displayed on the display 11 in the first display order from the plurality of images stored in the server-side storage 22. With the initial image V1 as a first image, the server-side controller 23 repeatedly executes the processing of selecting the image with the smallest rewriting cost required by the image rewriter 12, when changing the image displayed on the display 11 from the plurality of images to the image in the next display order, thus determining the display order.

Specifically, the server-side controller 23 arbitrarily selects the initial image V1 to be displayed on the display 11 in the first display order from the plurality of image data stored in the server-side storage 22. The server-side controller 23 then selects the images in the second and lower display order from the plurality of images stored in the server-side storage 22 other than the initial image V1. As a second image V2 in the second display order, the image data having the smallest rewriting cost rewriting from the initial image V1 among the image data stored in the server-side storage 22 other than the initial image V1 is selected. Similarly, for the image data in the third and lower display order, the image data having the lowest rewriting cost rewriting from the image data in one higher display order is selected. By making such selections for all the image data to be displayed on the display 11, the server-side controller 23 generates the display order pattern P1. The server-side controller 23 determines the generated display order pattern P1, which is one display order pattern P, as the display order of the images. As a result, the server-side controller 23 does not need to generate all the display order patterns P that can be generated by randomly arranging image data, thus reducing the time required for the server-side controller 23 to determine the display order.

Although it has been described that the server-side controller 23 generates one display order pattern P1, a plurality of order patterns P1 may be generated. As a result, when the server-side controller 23 generates some of the display order patterns P that can be generated by randomly arranging the image data, it is more likely that the generated plurality of display order patterns P1 include the display order pattern P1 having the same or similar rewriting cost as the smallest rewriting cost among all the display order patterns P that can be generated by randomly arranging the image data.

It has also been described that the server-side controller 23 arbitrarily selects the initial image V1 from the plurality of image data stored in the server-side storage 22. Alternatively, to select the initial image V1 may be described as a rule in advance in the computer program that is executed by the server-side controller 23, so that the server-side controller 23 can select the initial image V1 according to the rule to select the initial image V1 in the computer program.

Figure 6:
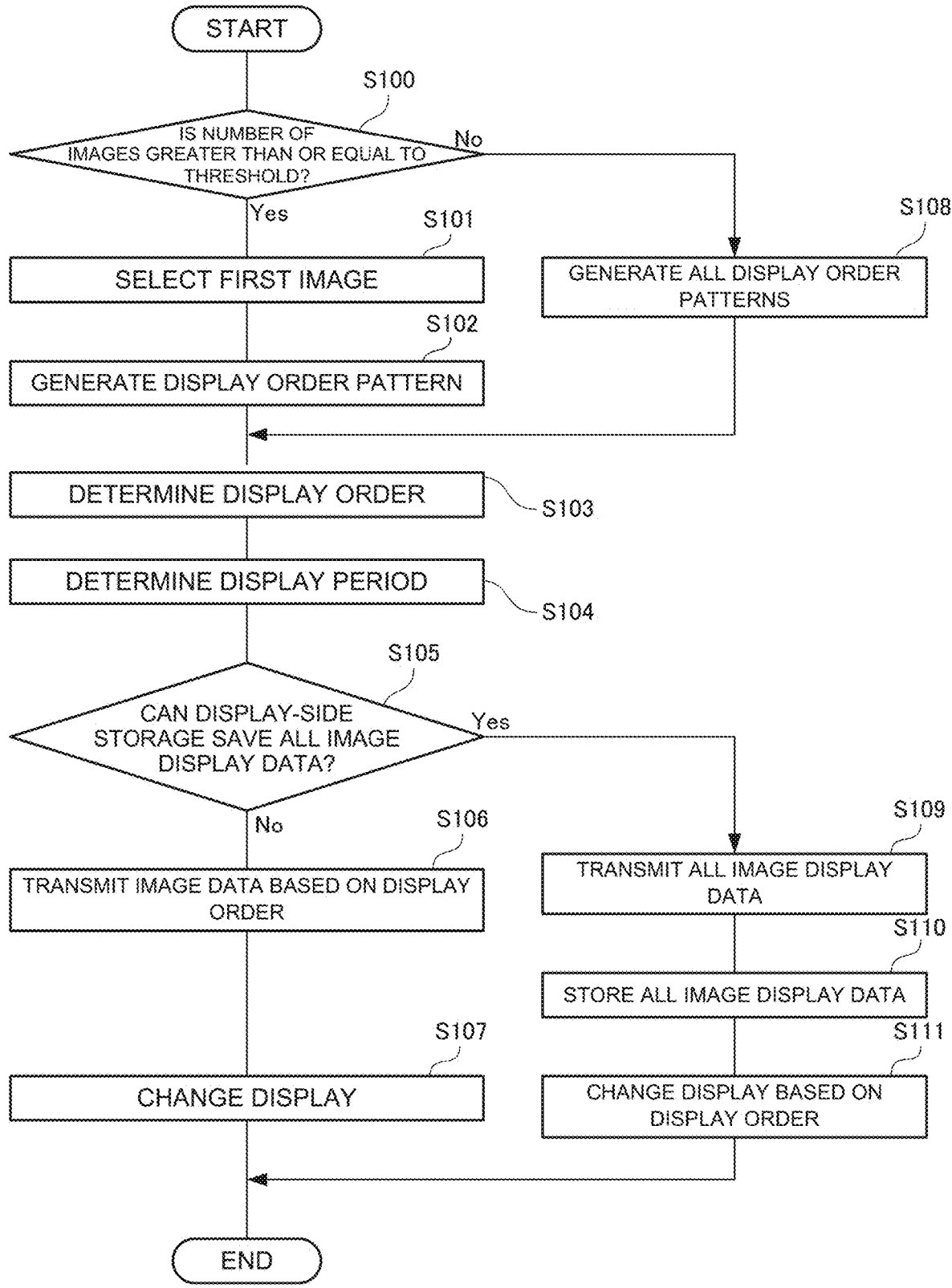
FIG. 6 is a flowchart illustrating the processing of the display device according to the second embodiment.

By referring to FIGS. 5 and 6, the processing of the display device 200 according to the second embodiment is described below. FIG. 6 is a flowchart illustrating the processing of the display device 200 according to the second embodiment. The processing of the display device 200 includes steps S100 to S111.

First, in step S100, the server-side controller 23 determines whether the number of images stored in the server-side storage 22 exceeds the threshold, like step S1 described in the processing of the first embodiment illustrated in FIG. 4. If the positive decision (Yes) is made in step S100, the process proceeds to step S101.

In step S101, the server-side controller 23 arbitrarily selects initial image V1 from the plurality of images stored in the server-side storage 22.

In step S102, with the initial image V1 as the first image, the server-side controller 23 selects the images in the second and lower display order from the plurality of images stored in the server-side storage 22 other than the initial image V1 according to the rewriting cost, thus determining the display order pattern P1.

In step S103, the server-side controller 23 determines the generated display order pattern P1 as the display order of images.

The process then proceeds to step S104. The processing in and after step S104 is the same as the processing in and after step S5 described in the processing of the first embodiment illustrated in FIG. 4, and the description thereof is omitted. The processing in the steps S104 to S111 respectively corresponds to the processing in the steps S5 to S12.

Third Embodiment

Figure 7:
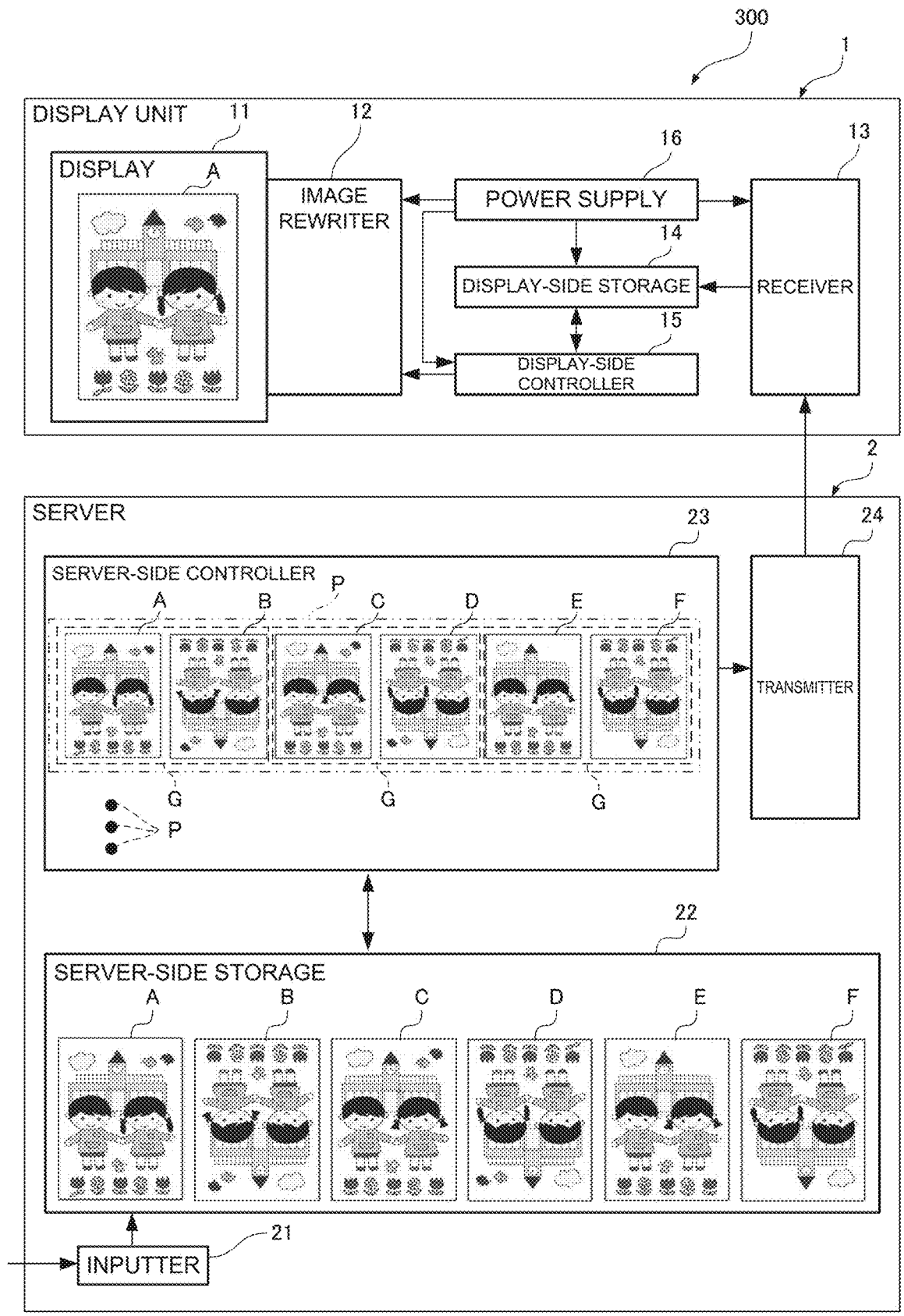
FIG. 7 illustrates a schematic diagram of a display device according to a third embodiment.

Referring to FIG. 7, a display device 300 according to a third embodiment is described. FIG. 7 illustrates a schematic diagram of the display device 300 according to the third embodiment. The display device 300 according to the third embodiment differs from first embodiment mainly in the generation of the display order pattern P in the server-side controller 23. The difference between the third embodiment and the first embodiment is mainly described below.

The server-side controller 23 illustrated in FIG. 7 divides all of the plurality of images stored in the server-side storage 22 into a plurality of groups G. The server-side controller 23 determines the display order in each group G of the plurality of images included in each group G based on the rewriting cost for each of the plurality of divided groups G. This determines the display order of all of the plurality of images.

Specifically, the server-side controller 23 randomly sorts the plurality of image data stored in the server-side storage 22 into the plurality of groups G for each image data. The server-side controller 23 arranges the image data sorted to each group G of the plurality of groups G according to the rewriting cost. For example, the image data sorted into the plurality of groups G is arranged in each group G so that the total rewriting cost is minimal. In addition to arranging the image data in all the groups G, the server-side controller 23 arranges the plurality of groups G in any order to generate one display order pattern P. As a result, when the server-side controller 23 generates some of the display order patterns P that can be generated by randomly arranging the image data, it is more likely that the generated plurality of display order patterns P includes the display order pattern P having the same or similar rewriting cost as the smallest rewriting cost among all the display order patterns P that can be generated by randomly arranging the image data.

It has also been described that the server-side controller 23 generates one display order pattern P by arranging the plurality of groups G in any order. Alternatively, the order in which the plurality of groups G is arranged may be determined according to the rewriting cost. For example, a group G which is arranged one behind the group G in the first display order may be selected based on the rewriting cost rewriting from the image in the last display order in one group G to the image in the first display order in another group G. As a result, when generating some of the display order patterns P that can be generated by randomly arranging the image data, it is more likely that the generated plurality of display order patterns P includes the display order pattern P having the same or similar rewriting cost as the smallest rewriting cost among all the display order patterns P that can be generated by randomly arranging the image data.

Figure 8:
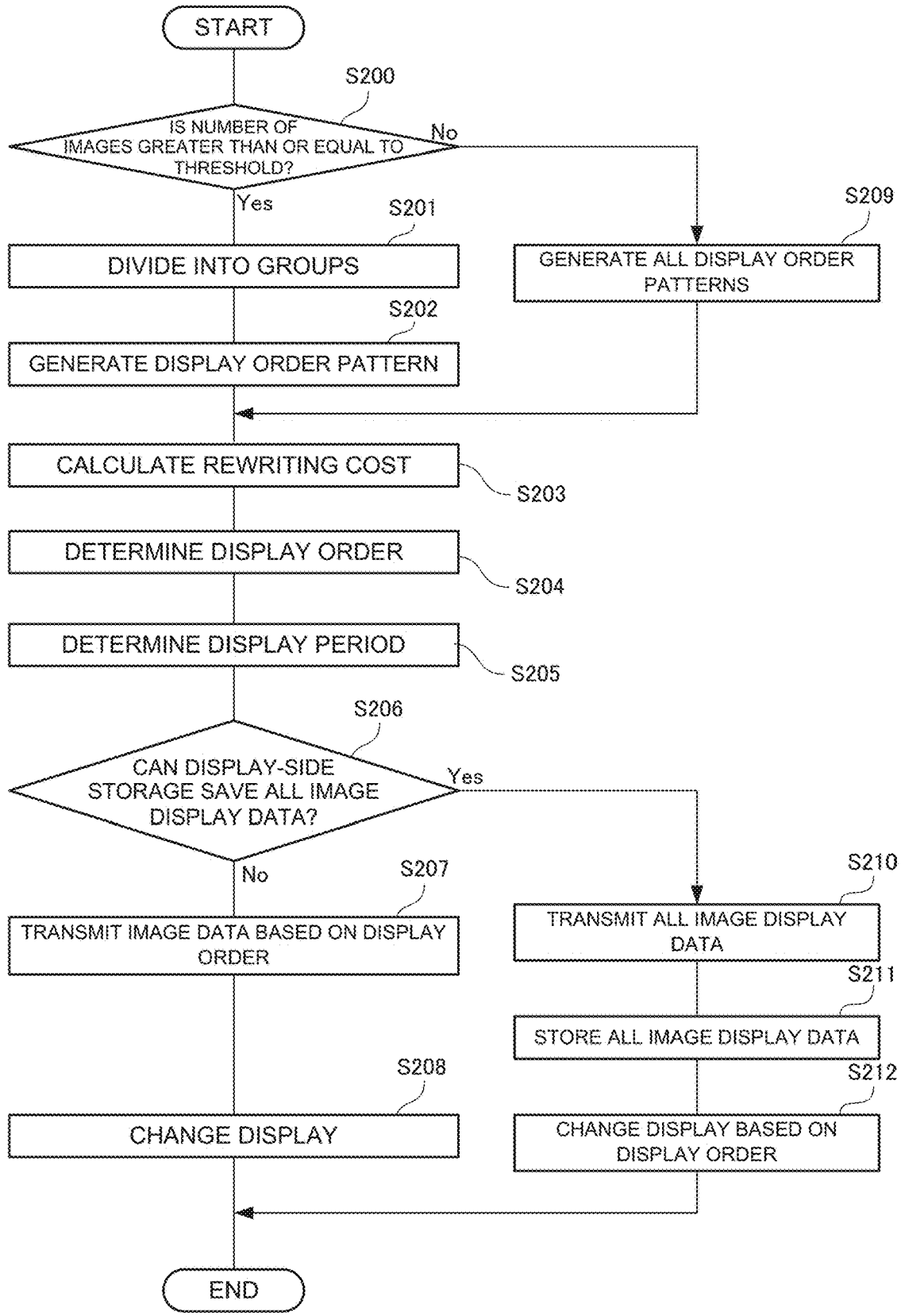
FIG. 8 is a flowchart illustrating the processing of the display device according to the third embodiment.

By referring to FIGS. 7 and 8, the processing of the display device 300 according to a third embodiment is described. FIG. 8 is a flowchart illustrating the processing of the display device 300 according to the third embodiment. The processing of the display device 300 includes steps S200 to S212.

First, in step S200, the server-side controller 23 determines whether the number of images stored in the server-side storage 22 is greater than or equal to the threshold, like the step S1 described in the processing of the first embodiment illustrated in FIG. 4. If the positive determination (Yes) is made in step S200, the process proceeds to step S201.

In step S201, the server-side controller 23 divides the plurality of images stored in the server-side storage 22 into the plurality of groups G.

In step S202, the server-side controller 23 generates the display order pattern P based on the rewriting cost in each group G and between the divided groups G.

The process then proceeds to step S203. The processing in and after step S203 is similar to that described in and after step S3 in the first embodiment illustrated in FIG. 4, and the description thereof is omitted. The processing in steps S203 to S212 respectively corresponds to the processing in steps S3 to S12.

Fourth Embodiment

Figure 9:
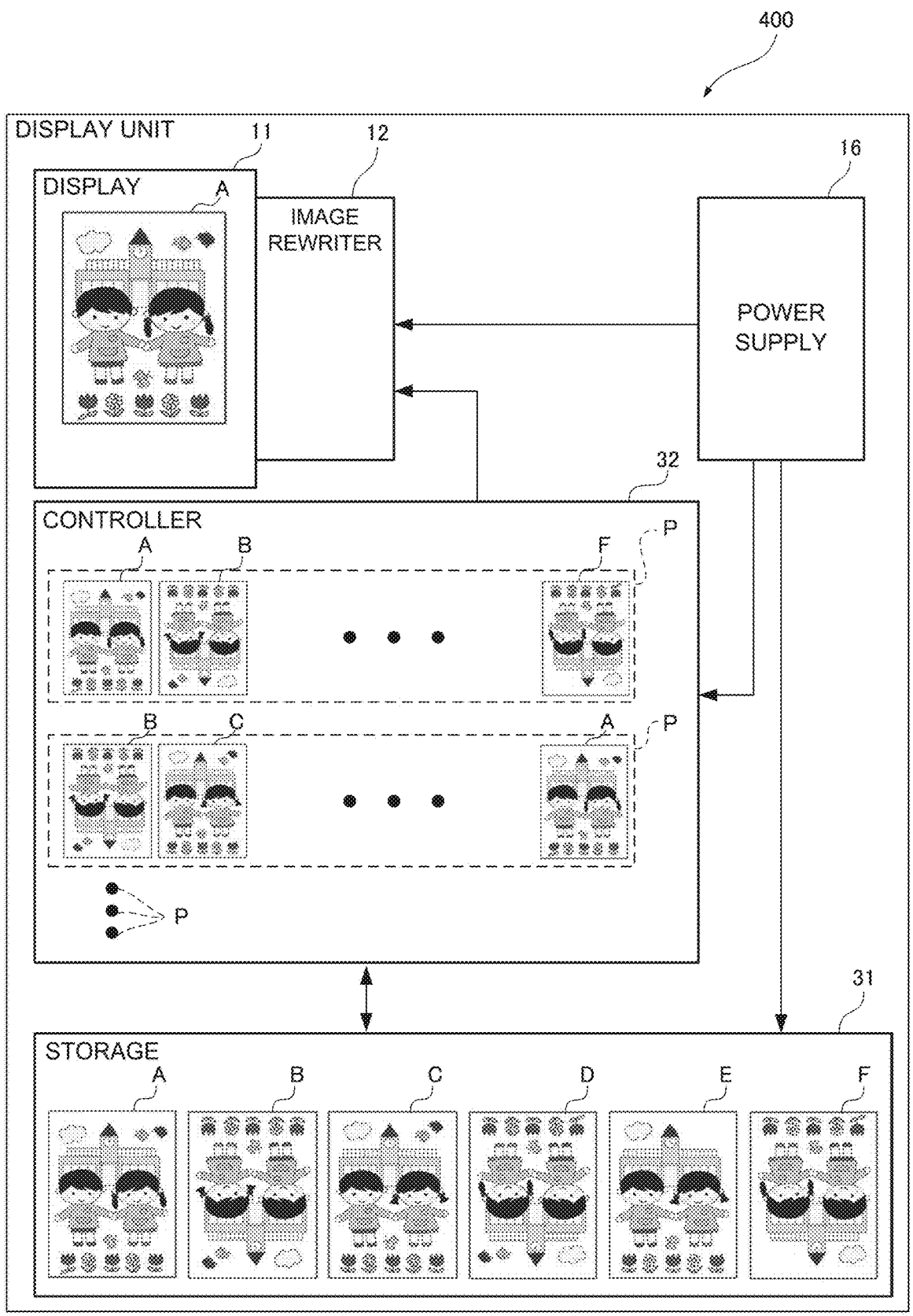
FIG. 9 illustrates a schematic diagram of a display device according to a fourth embodiment.

Referring to FIG. 9, a display device 400 according to a fourth embodiment is described. FIG. 9 illustrates a schematic diagram of the display device 400 according to the fourth embodiment. The display device 400 illustrated in FIG. 9 mainly differs from the display devices according to the first to third embodiments in that the display device 400 combines the functions of the display unit 1 (see FIGS. 1, 5, and 7) and the server 2 (see FIGS. 1, 5, and 7), although the display devices 100, 200, and 300 according to the first, second, and third embodiments and illustrated in FIGS. 1, 5, and 7, respectively include the display unit 1 and the server 2 provided separately and performing different functions. The difference between the fourth embodiment and the first to third embodiments is mainly described below.

As illustrated in FIG. 9, the display device 400 according to the fourth embodiment includes the display 11, the image rewriter 12, the power supply 16, a storage 31, and a controller 32. The display device 400 according to the fourth embodiment includes the display 11 and the image rewriter 12, similar to the display device 100 according to the first embodiment (see FIG. 1), the display device 200 according to the second embodiment (see FIG. 5), and the display device 300 according to the third embodiment (see FIG. 7). On the other hand, the display device 400 according to the fourth embodiment differs from the first to third embodiments in the target to which the power supply 16 supplies power. The display device 400 according to the fourth embodiment differs from the first to third embodiments in that the display device 400 includes the storage 31 that combines the functions of the display-side storage 14 and the server-side storage 22 according to the first to third embodiments illustrated in FIGS. 1, 5, and 7, and the controller 32 that combines the functions of the display-side controller 15 and the server-side controller 23 of the display device 100 according to the first embodiment. The display device 400 according to the fourth embodiment also differs from the display device according to the first to third embodiments in that the receiver 13 and the transmitter 24 are not provided, because the functions of the display unit 1 and the server 2 illustrated in FIGS. 1, 5, and 7 are integrated, so there is no need to transmit and receive the image data and the like.

The power supply 16 of the fourth embodiment supplies power to the image rewriter 12, the storage 31, and the controller 32.

The storage 31 stores all image display data. The specific structure of the storage 31 is similar to that of the display-side storage 14 (see FIGS. 1, 5, and 7) or the server-side storage 22 (see FIGS. 1, 5, and 7), and the description thereof is omitted.

Similar to the server-side controller 23 (see FIGS. 1, 5, and 7) described above, the controller 32 generates the display order pattern P of the plurality of images to be displayed on the display 11 and, from the generated display order pattern P, selects and determines the display order of the plurality of images to be displayed on display 11. The generation of the display order pattern P and the determination of the display order are similar to those described in the server-side controller 23 (see FIGS. 1, 5 and 7) in the first to third embodiments, and the description thereof is omitted. The controller 32 controls the image rewriter 12 like the display-side controller 15 (see FIGS. 1, 5, and 7).

Since the display device 400 of the fourth embodiment integrates the functions of the display unit 1 (see FIGS. 1, 5, and 7) and the server 2 (see FIGS. 1, 5, and 7), the number of devices to be installed can be set to one. This is advantageous in requiring only one installation location. Like the first to third embodiments, the amount of power consumed when the images are displayed sequentially can be kept low, because the order in which the images are displayed is determined according to the rewriting cost.

The embodiments of the present disclosure have been described above with reference to the attached drawings. However, the present disclosure is not limited to the embodiments described above and may be implemented in various different forms that do not deviate from the gist of the present disclosure. In the drawings, the components are primarily illustrated in a schematic manner for easy understanding, and thicknesses, lengths, numbers, intervals, and the like of the illustrated components are different from the actual ones for convenience of the drawings. Furthermore, materials, shapes, dimensions, and the like of the components illustrated in the above embodiment are merely examples and are not particularly limited and may be variously modified without substantially departing from the configuration of the present disclosure.

The invention claimed is:

1. A display device, comprising:
a display order determiner that determines a display order of a plurality of images;
a display that sequentially changes and displays the plurality of images according to the display order determined by the display order determiner; and
an image rewriter that rewrites at least a part of an image, among the plurality of images, displayed on the display to change the image displayed on the display to a next image in the display order, wherein
the display order determiner determines the display order based on a rewriting cost required by the image rewriter in changing the plurality of images, and
the display order determiner generates a plurality of display order patterns, and determines a display order pattern, among the plurality of display order patterns, with a smallest total rewriting cost as the display order.

2. The display device according to claim 1, wherein
the display order determiner generates all display order patterns that are assumed to be the display order in which the plurality of images is displayed on the display.

3. The display device according to claim 1, wherein
the display order determiner generates part of the plurality of display order patterns out of all display order patterns that are assumed to be the display order in which the plurality of images is displayed on the display.

4. A display device, comprising:
a display order determiner that determines a display order of a plurality of images;
a display that sequentially changes and displays the plurality of images according to the display order determined by the display order determiner; and
an image rewriter that rewrites at least a part of an image, among the plurality of images, displayed on the display to change the image displayed on the display to a next image in the display order, wherein
the display order determiner determines the display order based on a rewriting cost required by the image rewriter in changing the plurality of images, and
the display order determiner determines the display order by repeatedly performing a process of:
selecting an initial image, among the plurality of images, to be displayed, on the display, as a first image in the display order, and
with the initial image being displayed as the first image, selecting an image, among the plurality of images, that has a smallest rewriting cost, required by the image rewriter, as a next image in the display order, when changing and displaying the first image displayed on the display to the next image in the display order.

5. A display device, comprising:
a display order determiner that determines a display order of a plurality of images;
a display that sequentially changes and displays the plurality of images according to the display order determined by the display order determiner; and
an image rewriter that rewrites at least a part of an image, among the plurality of images, displayed on the display to change the image displayed on the display to a next image in the display order, wherein
the display order determiner determines the display order based on a rewriting cost required by the image rewriter in changing the plurality of images, and
the display order determiner divides all the plurality of images into a plurality of groups, and determines the display order of all the plurality of images by determining, for each of the plurality of groups, an intra-group display order of the plurality of images in each of the plurality of groups based on the rewriting cost required by the image rewriter in changing and displaying the image on the display.

* * * * *